United States Patent Office 2,930,654
Patented Mar. 29, 1960

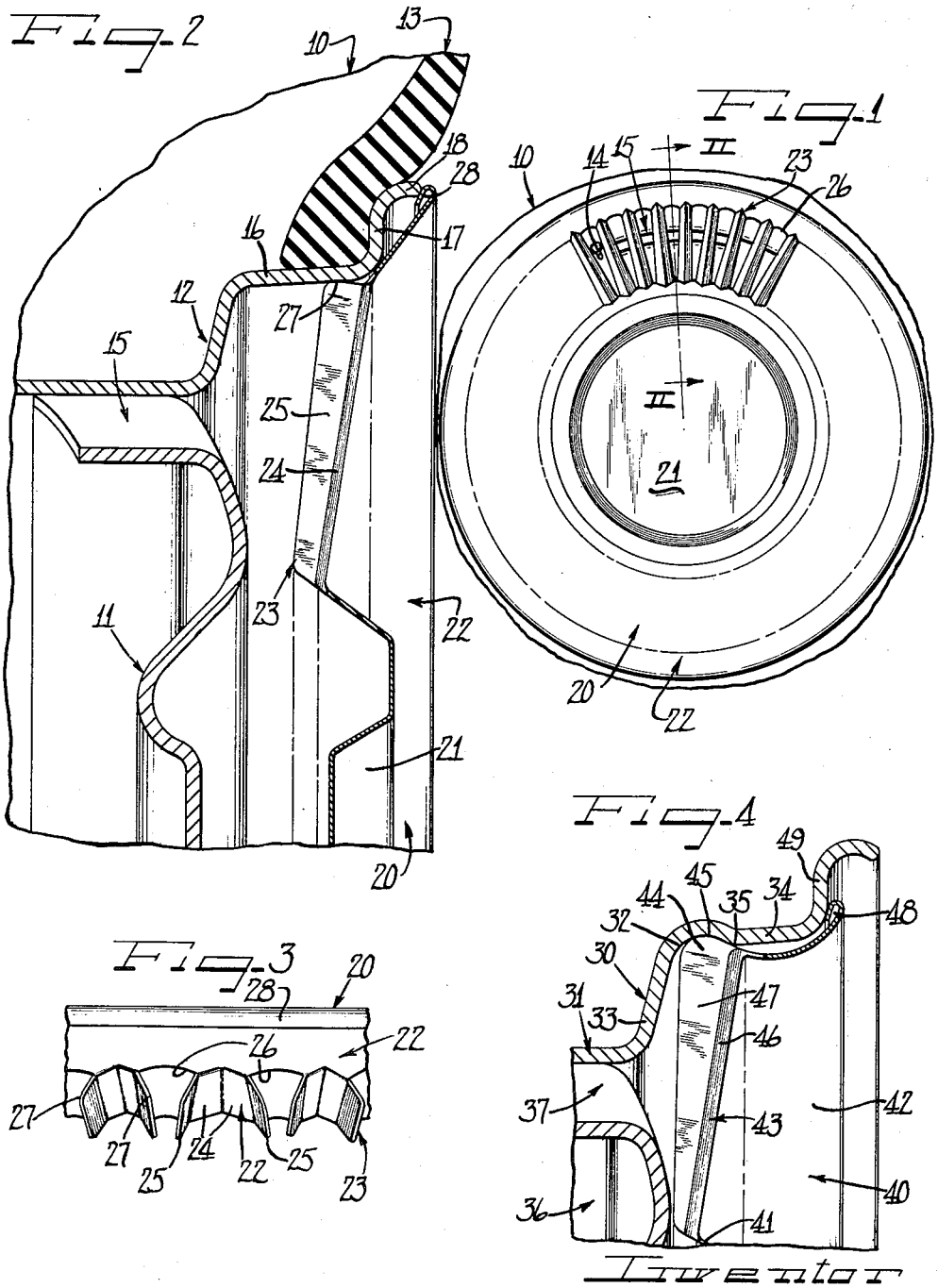

2,930,654

WHEEL COVER

George Albert Lyon, Detroit, Mich.

Application July 13, 1956, Serial No. 597,638

8 Claims. (Cl. 301—37)

This invention relates generally to a new and improved wheel structure and more particularly to a highly ornamental protective wheel cover member for retained disposition upon a vehicle wheel.

The present invention concerns itself with a spoke-type cover construction having generally radial elongated relatively resiliently deflectable portions. These portions are cut-out from the cover and are connected to the cover by reason of being integral with circumferentially spaced spoke-like elements. In the present instance, there are two spoke portions on the spoke-like elements which portions extend divergently away from one another. These portions have resiliently deflectable edges which are particularly adapted to retain the cover member upon the wheel.

Accordingly, an object of this invention is to provide a new and improved highly ornamental wheel cover member having novel means for maintaining the cover in assembly upon a vehicle wheel.

Still another object of this invention is to provide circumferentially spaced spoke elements on a wheel cover member with at least certain of the elements having rearwardly and divergently extending spoke portions which are elongated radially to provide ample flexibility for ready snap-on, pry-off engagement with a vehicle wheel.

A still further object of this invention is to provide a new and improved cover construction having novel means for maintaining the cover in assembly upon a vehicle wheel and which cover is economical to manufacture and lends itself to manufacture on a large production basis.

According to the general features of this invention there is provided in a wheel structure including a wheel with circumferentially spaced wheel openings and having rim and body parts with the rim having an annular radially facing flange, a wheel cover member including radially inner and outer cover portions having circumferentially spaced generally radially extending generally U-shaped spoke-like elements for cover retaining engagement with the wheel, the spoke-like element including generally axially obliquely divergently extending spoke portions each having a radially outwardly facing resiliently deflectable edge for cover retaining engagement with the radially facing flange, each of the elements having a radial dimension several times its axial dimension so as to provide a highly resilient and flexible retaining action, each of the spoke-like elements being separated from one another by cover openings with the cover openings generally opposite the wheel openings to facilitate the circulation of air therethrough.

Other objects and features of the present invention will more fully become apparent in view of the following detailed description taken in conjunction with the accompanying single sheet of drawings illustrating several embodiments in which:

Figure 1 is a side elevation of my wheel structure;
Figure 2 is an enlarged fragmentary cross-sectional view taken substantially on the line II—II of Figure 1 looking in the direction indicated by the arrows;

Figure 3 is an enlarged fragmentary edge elevation of my cover member highlighting the spoke portions; and Figure 4 is an enlarged fragmentary cross-sectional view similar to Figure 2 only illustrating a modified form of my invention.

As shown on the drawings:

A reference numeral 10 indicates generally my wheel structure and includes a wheel having a body part 11 suitably connected to a stepped multi-flange drop center type tire rim 12. The tire rim 12 carries a conventional tire assembly 13 which may be either a pneumatic tubeless or tube type of tire assembly. The tire assembly 13 may be inflated by inserting air into the valve stem 14 shown in Figure 1.

The wheel lends itself to being attached to an axle of an automobile vehicle and the like by means of inserting lugs on the vehicle axle through the body part 11 and clamping the body part 11 to the axle by threading nuts onto the lugs in a conventional manner.

At circumferentially spaced intervals between the rim and body parts 11 and 12 are disposed wheel openings 15 which open rearwardly and allow air to freely circulate through the wheel onto the brake drum area.

The tire rim 12 in the present instance includes an intermediate generally axially outwardly extending flange 16. Connected at the axially outer end of the flange 16 is a generally radially outwardly extending rim flange 17 which terminates in generally axially outwardly extending terminal rim flange 18.

Overlying the wheel is my ornamental protective cover member 20 having an inner crown area 21 and an outer cover margin 22 which crown area and cover margin are separated from one another by circumferentially spaced radially extending spoke-like elements 23.

As is most clearly seen in Figure 3, the elements 23 are each generally U-shaped or channelled and include a first pair of generally axially inwardly diverging or axially obliquely extending spoke body portions 24, each of which has disposed at its free end a second generally axially inwardly diverging or axially obliquely extending spoke retaining portion 25. The retaining portions 25 are free to flex since they are free of the cover except for their connection with the body portions.

Each of the spoke elements 23 are separated from one another by cover openings 26, which cover openings are positioned generally axially outwardly, but opposite the wheel openings 15. For purposes of directing the air through the cover openings 26 into the wheel openings 15, the spoke elements 23 have axially inwardly diverging portions 24 and 25 to permit the air to be focused and compressed through the cover and wheel openings.

In the manufacture of the instant cover 20, the spoke elements 23 are pressed out of the cover area disposed between the crown portion 21 and the outer margin 22. In fact, the spoke portions 25 are cut out from the cover to form the wheel openings 26.

In order to provide ample resiliency and deflectability for the spoke portions 25, the spoke portions are elongated radially and particularly constructed to have a length several times the width thereof. In addition, the spoke portions 25 are tapered with the spoke portions 25 having a reduced width at their junction with the crown 21 and being substantially widened generally at the junction of the spoke-like elements 23 with the outer margin 22.

In order to permit the spoke-like elements 23 to be in proximity to the intermediate rim flange 16 when the cover is in assembly upon the wheel, the spoked area of the cover is dished generally axially inwardly. Each of the spoke portions 25 is provided with a resiliently deflectable radially outwardly axially inwardly inclined gripping edge 27 which is adapted to retainingly cooperate in the maintenance of the cover upon the wheel by engaging the intermediate rim flange 16.

To assemble the cover 20 upon the wheel, the valve stem 14 is aligned to extend through one of the cover openings 26 and upon the application of an axially inward force, the edges 27 are resiliently deflected into retaining cooperation with the intermediate rim flange 16. It will be appreciated the retaining action is brought about by manufacturing the edges 27 so as to have a diameter which is slightly larger than the outside diameter of the intermediate rim flange 16. When the cover 20 is in full assembly upon the wheel the outer margin, and more particularly the underturned bead 28 is bottomed against the terminal rim flange 18 to provide a backup for the engagement of the edges 27 with the intermediate rim flange 16.

To remove the cover from the wheel, a suitable pryoff tool may be inserted underneath the pryoff bead 28 and upon the application of a suitable pryoff force, the cover may be ejected from the wheel.

In Figure 4 is shown a modified structure 30. In this instance, the wheel has a multi-flange drop center type tire rim 31 provided with an annular groove 32 generally at junction of radial rim flange 33 and intermediate axial rim flange 34. Disposed at the axially outer margin of the groove 32 is an annular shoulder 35. Cooperable with the tire rim 31 is a body part 36 and with circumferentially spaced wheel opening 37 disposed between the rim and body parts.

Engaged upon the wheel in overlying protective ornamental relation is my wheel cover member 40. The cover 40 includes a central crown 41 and an outer margin 42. Disposed between the crown portion 41 and the outer margin 42 are circumferentially spaced U-shaped spoke-like elements 43.

Each of the spoke elements 43 are constructed substantially the same as the spoke elements 23 in the first form of my invention; however, the elements 43 are tapered at a wider angle so as to provide an enlarged nose portion 44 including a generally radially outwardly axially inwardly inclined or curved edge 45 for a nested engagement in the groove 32 behind the shoulder 35. As in the first form of my invention, the spoke-like elements 43 are each generally U-shaped. Each of the elements include a first pair of generally axially inwardly diverging or axially obliquely extending spoke body portions 46. Each of the spoke body portions 46 has disposed at its free end a second generally axially inwardly diverging or axially obliquely extending spoke retaining portion 47, the retaining portions 47 being free to flex in the same manner as previously described. Between these spokes are cover openings and again, the particularly configurated spoke elements facilitate the direction of air through the cover openings into the wheel opening 37 to cool the brake drum area thereof.

In this form of the invention, the margin 42 has an arcuate configuration and terminates in an underturned pryoff bead 48 which is adapted to bottom against radial rim flange 49, thereby affording a firm backup for the engagement of the nose portion 44 behind the shoulder 35.

To assemble the cover upon the wheel, the cover is initially aligned and centered with respect to the wheel and the valve stem (not shown) and upon the application of an axially inward force the nose portion 44, and more particularly the edge 45 is caused to resiliently deflect and be cammed generally radially inwardly until the nose portion 44 and edge 45 snap behind shoulder 35 into nested engagement with the groove 32. The highly resilient deflectability of the instant spoke elements 43 is brought about by virtue of the comparatively long length and short width thereof. Also, by virtue of the fact the edges 45 are normally arranged in a circle having an outside diameter slightly larger than the inside diameter of the groove and shoulder.

To remove the cover from the wheel a suitable pryoff tool may be inserted underneath the bead 48 and upon the application of a suitable pryoff force the elements 43 may be disengaged out of retaining engagement behind shoulder 35.

It will be understood that modifications and variations may be effected without departing from the scope of the novel concepts of the present invention.

I claim as my invention:

1. In a wheel structure including a wheel having rim and body parts with the rim having an annular radially facing flange, a wheel cover member including radially inner and outer cover portions having circumferentially spaced generally radially extending generally U-shaped spoke-like elements joining the cover portions together and for cover-retaining engagement with the wheel, said spoke-like elements including diverging spoke portions which extend generally axially obliquely, each of the spoke portions having a radially outwardly axially inwardly inclined resiliently deflectable edge for cover retaining engagement with the radially facing flange, each of said elements having a radial dimension several times its axial dimension so as to be highly resilient and flexible.

2. In a wheel structure including a wheel having rim and body parts, a wheel cover member for overlying disposition upon the wheel including radially spaced inner and outer annular cover portions and a series of circumferentially spaced generally radially extending channelled spoke-like cover retaining elements including diverging body and retaining portions with the diverging body portions having their radially opposite ends joining the inner and outer cover portions together and with the retaining portions on each of said elements diverging axially inwardly away from said body portions and being deflectable wholly free of said inner and outer annular cover portions except through their connection through the body portion, each of said retaining portions having a radially outwardly axially inwardly inclined resiliently deflectable edge for gripping cover retaining cooperation with the wheel.

3. In a wheel structure including a wheel having rim and body parts with the rim having an annular groove including a rim shoulder, a wheel cover member including radially spaced inner and outer annular cover portions and provided with circumferentially spaced generally radially extending channelled spoke-like elements between and joining the inner and outer cover portions together in assembly, said spoke-like elements including axially obliquely diverging spoke portions each having a radially outwardly axially inwardly inclined resiliently deflectable edge for cover-retaining engagement in the groove and behind the shoulder, each of said elements having a radial dimension several times its axial dimension so as to be highly resilient and flexible.

4. The wheel structure of claim 2 futher characterized by each of said elements having a radial dimension several times its axial dimension so as to provide a highly resilient and flexible retaining action.

5. In a wheel structure including a wheel having rim and body parts wtih the rim having an annular radially facing flange, a wheel cover member including radially inner and outer cover portions having circumferentially spaced generally radially extending generally U-shaped spoke-like elements joining the cover portions together and for cover-retaining engagement with the wheel, said spoke-like elements including diverging spoke portions which extend generally axially obliquely, each of the spoke portions having a radially outwardly axially inwardly inclined resiliently deffectable edge for cover retaining engagement with the radially facing flange, each of said elements having a radial dimension several times its axial dimension so as to be highly resilient and flexible.

6. In a wheel structure including a wheel with circumferentially spaced wheel openings and having rim body parts with the rim having an annular radially facing flange, a wheel cover member including radially inner and outer cover portions having circumferentially spaced generally radially extending generally channelled spoke-like elements joining the cover portion together and for cover-retaining engagement with the wheel, said spoke-like elements including generally axially obliquely divergently extending cover retaining portions each having a radially outwardly facing resiliently deflectable edge for cover-retaining engagement with the radially facing flange, each of said elements having a radial dimension several times its axial dimension so as to provide a highly resilient and flexible retaining action, each of said spoke-like elements being separated from one another by cover openings with said cover openings generally opposite the wheel openings to facilitate the circulation of air therethrough, said spoke-like elements each having air funnelling means comprising adjacent diverging body portions which diverging body portions extend axially inwardly toward the cover retaining portions and are diverged towards the cover openings to augment the circulation of air.

7. A wheel cover member including radially inner and outer cover portions having circumferentially spaced generally radially extending generally channelled spoke-like elements joining the cover portions together and for cover-retaining engagement with a vehicle wheel, said spoke-like elements including generally axially diverging cover retaining portions each having a radially outwardly facing resiliently deflectable edge for cover-retaining engagement with a radially facing rim flange on a vehicle wheel, each of said elements having a radial dimension several times its axial dimensions so as to provide a highly resilient and flexible retaining action, each of said spoke-like elements being separated from one another by cover openings to facilitate the circulation of air therethrough, the spoke-like elements each having air funnelling means comprising adjacent diverging spoke body portions which diverging spoke body portions are diverged toward the cover openings and are cooperable with the cover retaining portions to augment the circulation of air.

8. In a wheel structure including a wheel having rim and body parts with the rim having an annular groove including a rim shoulder, a wheel cover member including radially spaced inner and outer annular cover portions and provided with circumferentially spaced generally radially extending channelled spoke-like elements between and joining the inner and outer cover portions together in assembly, said spoke-like elements including axially obliquely diverging spoke portions each having a radially outwardly axially inwardly inclined resiliently deflectable edge for cover-retaining engagement in the groove and behind the shoulder, each of said elements having a radial dimension several times its axial dimension so as to be highly resilient and flexible, the deflectable edge of said spoke-like elements being curved for nested engagement in the groove and behind the shoulder.

References Cited in the file of this patent

UNITED STATES PATENTS

| | | |
|---|---|---|
| Re. 19,467 | Lyon | Feb. 12, 1935 |
| 2,386,236 | Lyon | Oct. 9, 1945 |
| 2,490,822 | Lyon | Dec. 13, 1949 |
| 2,705,172 | Lyon | Mar. 29, 1955 |
| 2,737,421 | Lyon | Mar. 6, 1956 |